United States Patent

[11] 3,584,894

| [72] | Inventor | George W. Jackson<br>Dayton, Ohio |
|---|---|---|
| [21] | Appl. No. | 835,398 |
| [22] | Filed | June 23, 1969 |
| [45] | Patented | June 15, 1971 |
| [73] | Assignee | General Motors Corporation<br>Detroit, Mich. |

[54] INTEGRAL DELAY-TYPE HEIGHT CONTROLLER
6 Claims, 18 Drawing Figs.

[52] U.S. Cl.................................................. 280/124,
137/627.5, 267/65
[51] Int. Cl...................................................... B60g 21/06
[50] Field of Search........................................... 280/124 F,
LR; 137/627.5; 267/65

[56] References Cited
UNITED STATES PATENTS
3,276,476 10/1966 Jackson.......................... 280/124FX 3,183,935 5/1965 Davies........................... 280/124FX

*Primary Examiner*—Philip Goodman
*Attorneys*—W. E. Finken and J. C. Evans

ABSTRACT: In preferred form, a combined fluid spring component and height controller for use in an automatic leveling system for a vehicle. The controller includes a cam operator extending through a side port in the controller housing to engage a part of the spring component to reflect changes in the vehicle attitude. Intake and exhaust valve assemblies are fluidly communicated with the control chamber of the fluid spring through the valve operator port. These valve assemblies are selectively opened and closed by a reciprocating shaft connected to the cam operator by overtravel means and further connected to a damping unit that controls movement of the shaft.

PATENTED JUN 15 1971

INVENTOR.
George W. Jackson
BY
J.C. Evans
ATTORNEY

INVENTOR
George W. Jackson
BY
J. C. Evans
ATTORNEY

INTEGRAL DELAY-TYPE HEIGHT CONTROLLER

This invention relates to automatic vehicle leveling systems and, more particularly, to improved height controller means for regulating the pressure in a control chamber of a fluid spring disposed between the sprung and unsprung masses of the vehicle and operative to maintain a desired predetermined height relationship therebetween.

Certain automatic leveling systems for maintaining a predetermined height relationship between the chassis of an automobile and its ground engaging axle assemblies include a fluid spring component that supplements the load carrying capacity of the primary vehicle spring. A pressure source is included in the system to supply pressurized fluid to the auxiliary suspension spring when the primary suspension spring is deflected by adding a load to the vehicle chassis. This will cause the auxiliary suspension component to supplement the load carrying capacity of the primary spring to return the vehicle chassis to a level or otherwise desired height relationship with respect to the ground engaging axle.

When a vehicle load is removed, the primary suspension spring and the pressurized auxiliary suspension component will coact to cause the chassis to raise above the desired height relationship. To correct this, pressurized fluid is exhausted from the auxiliary suspension spring. To accomplish this kind of control, a plural function height controller is included between the pressure source and the auxiliary suspension component and includes a first intake valve and a second exhaust valve both normally closed. The controller further includes an inlet port connected to the pressure source and an exhaust port connected to the control chamber of the auxiliary fluid spring component. Additionally, the controller includes an exteriorly located lever and a link directly connected between the sprung and unsprung masses of a vehicle to sense sustained changes in the height relationship therebetween to control the intake and exhaust valve components to control flow of pressurized fluid to or from the fluid spring as required to maintain the vehicle level.

Prior controllers have been located on the chassis at a point apart from the pressure source and the fluid spring component and, accordingly, require separate factory or field installation of many fluid couplings. Further, the linkage means for operatively connecting the controller between the sprung and unsprung masses of the vehicle must be accurately positioned and adjusted apart from other components of the system to assure desired operation of the system.

An object of the present invention is to improve fluid control in automatic leveling systems and the like by combining a plural function height controller with a fluid spring component in the assembly to eliminate the need for mechanical linkage between the height controller and vehicle chassis and axle parts.

A further object of the present invention is to provide a plural function height controller that is adapted to be connected to the sidewall of a fluid spring component to locate a cam operator of the controller in operative contact with a relatively movable part of the fluid spring component to sense changes in vehicle height and to operate exhaust and intake valve components in response to the changes so as to level the vehicle.

Still a further object of the present invention is to improve plural function height controllers in automatic leveling systems of the type mentioned in the immediately preceding object wherein the exhaust and intake valve components are directly communicated with the pressurized control chamber of the fluid spring through means including a side port through which the cam operator extends.

Still another object of the present invention is to improve plural function height controllers of the type including an exhaust valve and intake valve for controlling the pressure level in the control chamber of an auxiliary suspension spring of an automatic leveling system by the provision of a single valve plate within the assembly having plural flow openings therethrough and a single operating stem directed through each of the openings with a valving element thereon spring biased into sealing engagement with a valve seat on opposite faces of the plate and wherein the plate constitutes the sole means for locating the valving elements within the assembly thereby to simplify manufacture of the assembly.

To accomplish these and other objects of the present invention, a controller assembly is provided that includes a housing having a side port therein which is adapted to be fastened to an exterior portion of a fluid spring unit. A cam operator is directed through the side opening of the housing interiorly of the fluid spring where it contacts a second part of the spring movable relative to the part on which the housing is located. Relative movement between the two parts causes the cam operator to oscillate a movable member within the controller housing that, in turn, selectively controls opening and closing of an intake and exhaust valve adapted to communicate a pressure source and an exhaust port with the control chamber of the spring through a fluid path including the side port of the housing through which the cam operator is directed. This side port constitutes a fluid connection between the valve housing and the fluid spring that eliminates the need for a separate fluid conduit connection to the valve assembly.

Further objects and advantages of the present invention will be apparent from the following description, reference being had to the accompanying drawings wherein preferred embodiments of the present invention are clearly shown.

Figure 1:
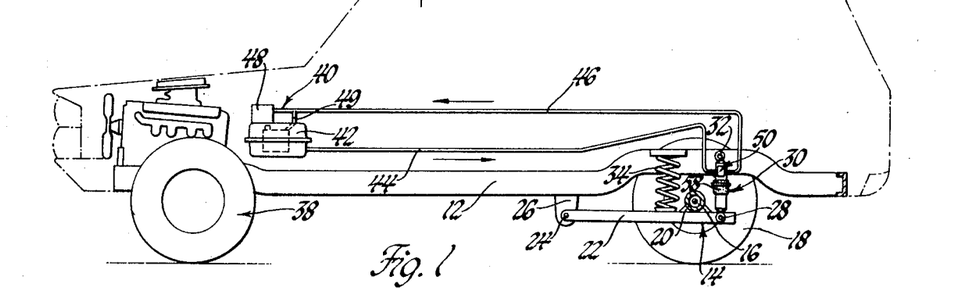
FIG. 1 is a diagrammatically illustrated side elevational view of an automatic leveling system on a vehicle including the present invention.

Referring now to the drawings, in FIG. 1, a vehicle 10 is illustrated having a chassis frame 12 supported at the rear thereof by a rear suspension assembly 14.

An axle 16 of the assembly 14 has a wheel and tire unit 18 secured on each end thereof in engagement with ground. An axle housing 20 supports the axle 16 and at each end of the axle housing 20 is located a control arm 22, one of which is illustrated in FIG. 1. Each of the control arms 22 has its front end connected by a pin 24 to a mounting bracket 26 depending from the frame 12.

The opposite end of the control arm is connected by a pivot pin 28 to the bottom mount of a shock absorber and air spring assembly 30. A pivot pin 32 connects the upper mount of the assembly 30 to the frame 12.

A coil type primary suspension spring 34 has one end thereof supported by the control arm 22 between the pivot pin 24 and the axle housing 20 and the opposite end thereof in engagement with the frame 12 for resiliently supporting it and the remainder of the vehicle chassis on the ground engaging rear suspension assembly 14.

The front of the frame 13 is carried by a front suspension system 36 including ground engagement tire and wheel assemblies 38 on each side of the front of the vehicle.

The vehicle 10 includes an automatic level control system 40 having a pressure source 42 in the engine compartment of the type including an electric motor driven compressor contained in a hermetically sealed canister. The pressure source 42 is connected by a high pressure or supply conduit 44 which runs the length of the vehicle to the shock absorber and air spring assembly 30. A low pressure or dump return conduit 46 is connected between the assembly 30 and a regulator switch 48 that senses the pressure in the conduit 46 and an intake line 49 to the compressor for regulating operation of the compressor so as to assure an operating pressure source.

More particularly, in the illustrated system, the high-pressure conduit 44 is connected to an integral multiple function height controller 50 which, in accordance with one of the principles of the present invention, is integrally joined to and supported by the shock absorber and air spring assembly 30. The assembly represents a pressurizable fluid spring component in the automatic level control system 40 that supplements the load carrying capacity of the primary suspension springs 34.

The multiple function height controller 50 also is connected to the conduit 46 for returning fluid from the air spring part of the assembly 30 back to the intake conduit 49 of the compressor portion of the pressure source 42.

Referring now more particularly to FIGS. 2 through 11, the shock absorber and air spring assembly 30 is illustrated as including a piston rod 52 having the upper end thereof connected to the top mount of the assembly 30 and being directed interiorly of an outer cylindrical housing 54 that constitutes the outside of a double, direct acting, hydraulic shock absorber which includes suitable means for dampening both jounce and rebound movements of the chassis 12 with respect to the ground engaging rear axle assembly 14.

Reference may be had to U.S. Pat. No. 3,039,760 for a better understanding of the hydraulic shock absorber portion of a combination shock absorber and air spring unit assembly of the type used in association with the present invention.

For purposes of the present invention, it is only necessary to point out that the outer cylinder 54 has the lower end thereof connected to the bottom mount of the assembly 30 and that the upper end of the piston rod 52 is connected to the top of a tubular rigid dust shield member 56 that is located in telescoping spaced surrounding relationship with the cylinder 54. Additionally, the dust shield and cylinder 54 are joined by a flexible rolled sleeve member 58.

More particularly, the sleeve member 58 has one end thereof sealingly connected by a ring 60 to the bottom end of the dust shield member 56 and includes an inwardly turned end thereof sealingly secured to the cylinder 54 by a ring member 62. The dust shield 56, the cylinder 54 and the ring secured flexible sleeve 58 define a variable volume, pressurizable control chamber 64 that is either exhausted or inflated under the control of the integral multiple function height controller 50 to maintain a predetermined height relationship between the frame 12 and the axle assembly 14.

In the illustrated arrangement, the inventive integral multiple function controller 50 includes an open ended body 66 with a cover 68 connected thereto by a plurality of screws 70 and sealed with respect thereto by a cover gasket 72.

Figures 4, 5:
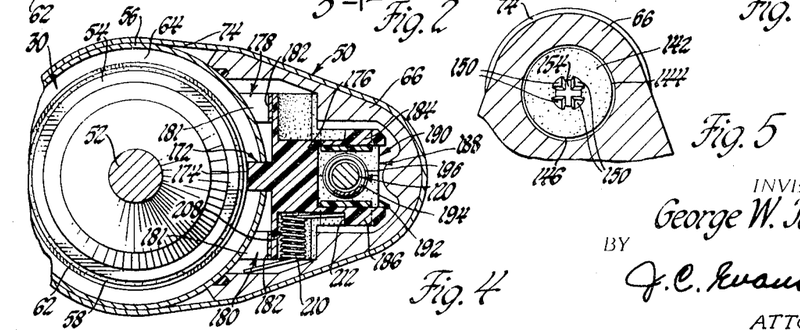
FIG. 4 is a view in horizontal section taken along the line 4-4 of FIG. 2 looking in the direction of the arrows.
FIG. 5 is a horizontal sectional view taken along the line 5-5 of FIG. 3 looking in the direction of the arrows.

The body 66 and cover 68 are fixedly secured to one side of the dust shield 56 by a connecting band 74 that wraps around the outside of the dust shield 56 and the outer configuration of the body 66 at the upper end thereof as is best illustrated in FIG. 4. By virtue of this arrangement, the controller 50 is made integral with the fluid spring component of the system 40 and is located in the system without requiring separate fasteners, positioning or other assembling steps either at a factory or field installation location.

Furthermore, the integral connection of the multiple function controller 50 at the fluid spring in the system 40 makes it possible to ship and store these components of the system as a unit quickly and easily installed in association with a suitable pressure source merely by connecting the controller between a high- and a low-presure source which, in the representatively illustrated system 40, includes the canister 42 of the pressure source as the high-pressure source and the return conduit 49 to the compressor as the low-pressure source. Such a system is referred to as a closed loop, automatic leveling system. The invention also is suitable for association with other kinds of leveling systems, for example, an open loop system which includes a supply conduit from the pressure source to the controller with the exhaust or outlet port of the controller 50 being in direct communication with atmosphere.

In accordance with certain principles of the present invention, the body 66 and cover 68 define a direct fluid communication between the external plumbing in the system 40 and the pressurizable chamber 64 thereby eliminating the need for fluid fittings on the fluid spring itself or fluid conduit couplings between the fluid spring itself and the valve housing 66.

Figure 2:
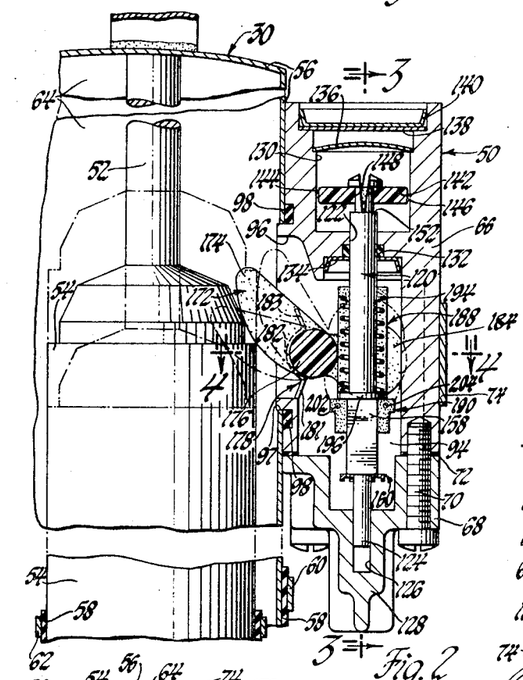
FIG. 2 is an enlarged fragmentary view in vertical section of a segment of a combination shock absorber and air spring assembly including the valve assembly of the present invention.
Figure 3:
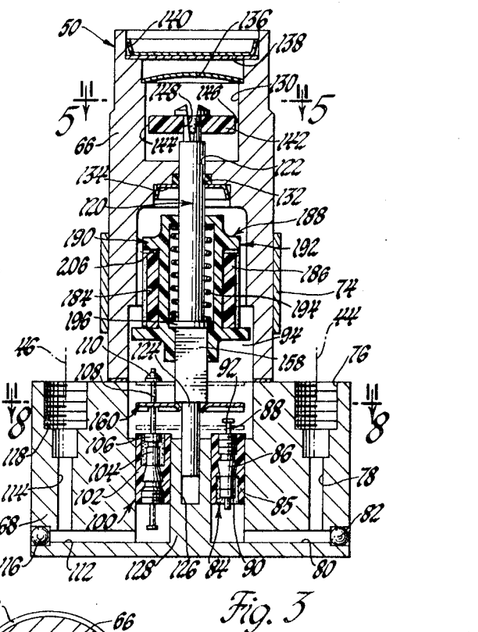
FIG. 3 is a vertical sectional view taken along the line 3-3 of FIG. 2 looking in the direction of the arrows.

More particularly, in the embodiment of the invention illustrated in FIGS. 1 through 11, this is attained by provision of an inlet port 76 in the cover 68 that fluidly communicates with 108 angle bores 78, 80 therein. The bore 80 is closed by a ball plug 82 and communicates with an inlet valve assembly 84 that is supported within the cover 68 by a core retainer 85. A core 86 of assembly 84 defines a flow path through which is directed an operating stem 88 having a valving element 90 fixedly secured on one end thereof that is biased by internal spring means (not shown) into a closed position against the bottom of the core 86 as illustrated in FIG. 3. Above the valving element 90, the stem 88 has a head 92 located within the interior 94 of the housing 66.

The interior 94 is in communication with a side outlet 96 on the housing that fits through a side opening 97 in the wall of the dust shield 56 as is best seen in FIG. 2. The side outlet 96 is sealed with respect to the dust shield 56 by a continuously formed annular sealing element 98.

The inlet valve assembly 84 and the housing interior 94 along with the side outlet 96 constitutes a direct interiorly located path from the high-pressure conduit 44 to the pressurizable control chamber 64 when the valve 90 is open.

Likewise, the side port 96 and housing interior 94 form a direct connection between the pressurizable control chamber 64 and an exhaust or outlet valve assembly 100 located in the cover in close spaced parallelism with the valve assembly 84.

A core retainer 102 locates a core 104 within the cover 68. The top of the core 104 is closed by a valving element 106 on one end of an operating stem 108 directed through the core 104 and maintained in a position by spring means (not shown) that hold the valving element in its closed position. In the position illustrated in FIG. 3, a head portion 110 of the stem 108 is located within the interior 94 of the housing body 66.

The valve assembly 100 serves to communicate the housing interior 94 with right angle bores 112, 114 in the cover 68. The bore 112 is closed by a ball plug 116 and the bore 114 is in communication with an outlet or exhaust port 118 that in turn is connected to the low pressure or exhaust conduit 46 back to the intake conduit to the compressor.

Within the housing interior 94 is located an elongated operating shaft 120 that has its upper end slidably supported at 122 in the housing 66 and a shank 124 on the opposite end thereof that is received in a guide opening 126 in a depending extension 128 on the cover 68. The operating shaft 120 is thereby maintained in vertical alignment for reciprocating movement within the housing interior 94. The shaft 120 extends into a dash pot bore 130 in the upper end of the housing 66. The bore 130 is sealed with respect to the housing interior 94 by an O-ring 132 held in place by a cup-shaped retainer ring 134.

The upper end of the dash pot bore 130 is closed by an expansion plug 136 of a yieldable metal material, for example, aluminum. It expands and contracts with respect to a space located thereabove closed by a disc gasket 138 held in place by a cup-shaped retainer ring 140.

A damping piston 142 located within the dash pot bore 130 is acted upon by a viscous damping fluid that fills the chamber 130 to control movement of the shaft 120.

More particularly, in the illustrated arrangement, the damping piston 142 includes an outer peripheral wall 144 located radially inwardly of the inside surface of the damping cylinder 130 to form an annular restricted orifice 146 for flow of fluid from one side to the opposite side of the piston 142. Temperature changes of the viscous damping fluid are compensated by the plug 136.

The piston 142 further includes a central opening 148 through which is directed four prongs 150 directed upwardly of a top shoulder 152 on the operating shaft 120.

Figures 6, 7, 8, 9, 10, 11, 12, 13:
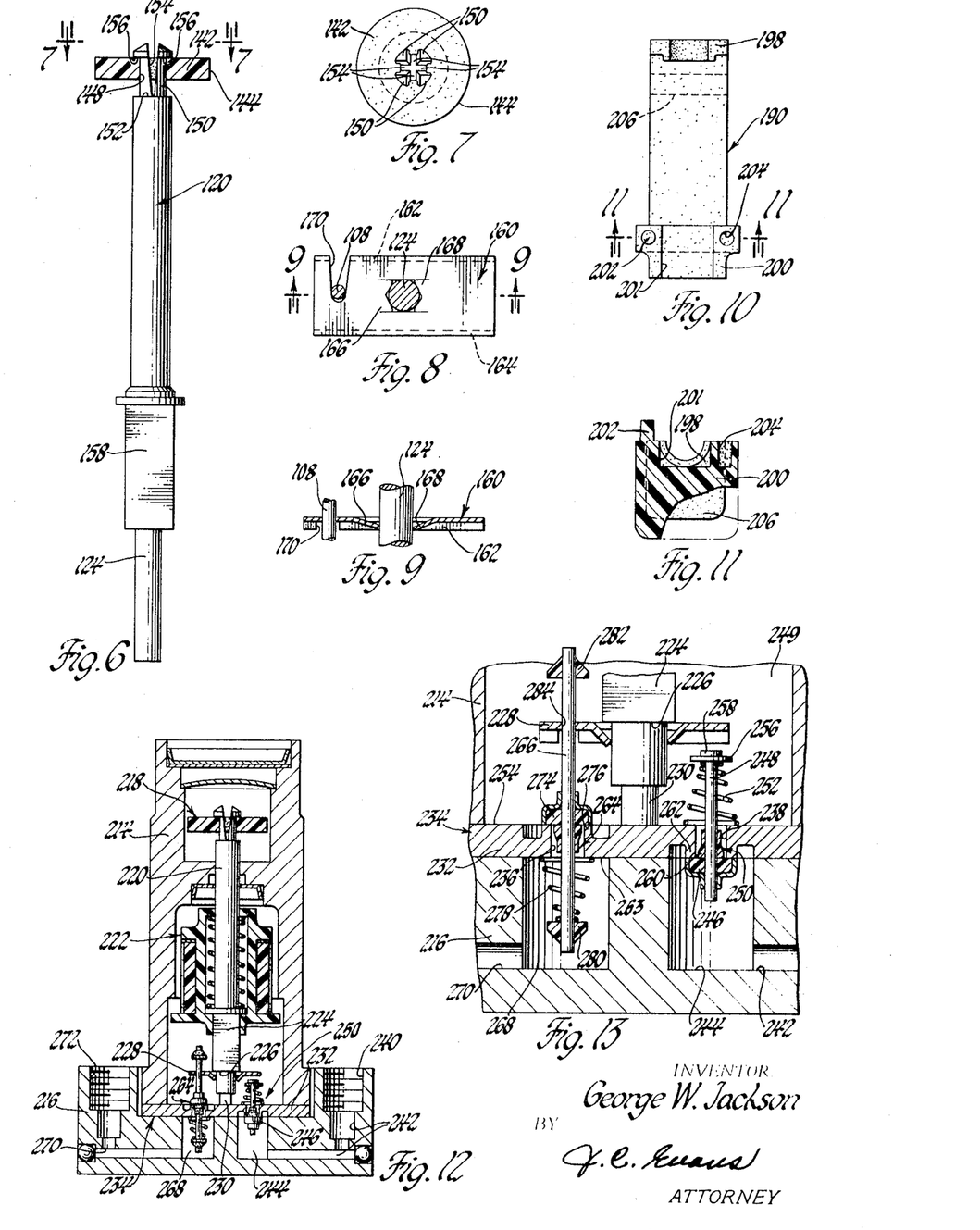
FIG. 6 is an enlarged view in side elevation of an operating shaft including a damping piston rod on the upper end thereof.
FIG. 7 is a view in top elevation of the shaft assembly in FIG. 6.
FIG. 8 is an enlarged view in FIG. cross section taken along the line 8-8 of FIG. 3.
FIG. 9 is a view in vertical section taken along the line 9-9 of FIG. 8 looking in the direction of the arrows.
FIG. 10 is a view in side elevation of an overtravel yoke of the assembly.
FIG. 11 is a horizontal cross-sectional view taken along the line 11-11 of FIG. 10 looking in the direction of the arrows.
FIG. 12 is a view in vertical section of another embodiment of the invention.
FIG. 13 is a fragmentary, enlarged vertical sectional view of a valve plate component in the embodiment of FIG. 12.

Each of the prongs 150 is separated from the other as is best illustrated in FIGS. 6 and 7 and adjacent ones of the prongs 150 define an elongated V-shaped opening 154 for flow of viscous fluid from one side of the piston 142 to the opposite side thereof. Furthermore, each of the prongs 150 includes a shoulder 156 located above the shoulder 152. The piston is free to move with respect to the prongs 150 between the shoulder 152 on the operating shaft 120 and the plurality of shoulders 150. The shoulder 152 serves as stop against upward movement of the operating shaft 120 relative to the piston 142. Likewise, the shoulders 156 of the prongs 150 serve as a stop against downward movement of the operating shaft 120 relative to the piston 142 by engaging the upper face of the piston 142.

On the opposite end of the shaft 120 at the intersection of the shank 124 and a square shaped guide surface 158 on the shaft 120 is located a clip member 160 of spring steel, best seen in FIGS. 8 and 9. The member 160 includes side flanges 162, 164 and a pair of downwardly struck center located legs 166, 168 that fixedly secure the clip 160 to the shaft shank 124. A side slot 170 in the clip 160 fits around the exhaust valve assembly operating stem 108 and, when the valve is in a neutral position, the head 110 of the stem 108 will be located as shown in FIG. 3 of the drawings with respect to the top of the clip 160. One side of the clip 160 overlies the head 92 of the operating stem 88 of the valve assembly 84 to selectively operate it between open and closed positions.

In accordance with certain principles of the present invention, the direct fluid path through the valve housing 66 also serves as a means for locating a cam element within the pressurized control chamber 64 of the fluid spring of the system 40 to detect relative movements between the sprung and unsprung masses of the vehicle and to operate the shaft 120 in accordance with these relative movements to compensate for changes in the standing height relationship between the sprung and unsprung masses of a vehicle, for example, the chassis frame 12 and the ground engaging rear axle suspension assembly 14 illustrated in FIG. 1. This is done to eliminate the need for external levers and links of the type used on present height controllers.

More particularly, a cam element 172 in the housing interior 94 includes a finger 174 that extends through side outlet 96 interiorly of the housing 64 at a point immediately above the top of the shock absorber cylinder 54. A shaft 176 on the element 172 extends on either side of the finger 174 and has its opposite ends journaled within a bearing formed by the housing 66 and a pair of spaced apart clip members 178, 180. Each of the clip members 178, 180 has a lower leg 181 that fits against the housing 66 adjacent the side port or opening 96 therein joined by a curved segment 182 to an outwardly flared distal end segment 183 as is best illustrated in FIG. 2.

The clips 178, 180 serve to resiliently maintain the cam shaft 176 within the housing 66 for free, limited relative rotation with respect thereto so as to allow the finger 174 to freely oscillate about the longitudinal axis of the shaft 176.

The cam element 172 further includes a bifurcate part defined by a pair of ears or lobes 184, 186 integrally formed with the shaft 176 and extending outwardly thereof in a direction opposite to the finger 174. More particularly, the ears or lobes 184, 186 are located on either side of the operating shaft 120 as is best seen in FIGS. 3 and 4 and is operative through an overtravel yoke assembly 188 to translate the oscillatory movement of the finger 174 into opposite reciprocation of the shaft 120 along the vertical axis thereof.

The overtravel yoke is made up of members 190, 192 located on either side of the operating shaft 120 to enclose a coil spring 194 that is wound around the shaft 120 between a stop flange 196 formed thereon at the square shank portion 158 thereof. The upper end of the coil spring 194 engages each of the separate yoke forming members 190, 192 so as to spring bias the yoke assembly 188 against the underside of the stop flange 196.

Each of the yoke members 190, 192 are more particularly illustrated in FIGS. 10 and 11 as including head portion 198 and a base portion 200. The head portion 198 is recessed to fit in sliding relationship on the curved outer surface of the operating shaft 120 and the base portion 200 has a rectangular slot 201 therein fit in sliding relationship on the square shank 158 to prevent relative rotative movement between the operating shaft 120 and the yoke assembly 188.

The base 200 includes a pin 202 and a hole 204 that are adapted to fit respectively in a like hole and/or to receive a like pin on the other one of the yoke members at the base thereof. The head 198 and base 200 of each of the yoke members 190, 192 form a side opening 206 which receives one of the ear lobes on the cam shaft.

The cam shaft includes an opening 208 on one end thereof in which is located a torsion spring 210 that has one end thereof in engagement with the housing 66 and the opposite end thereof located in a side slot 212 in the cam element 172 so as to produce a spring bias on the cam element 172 in a counterclockwise direction about the longitudinal axis of the shaft 176, as viewed in FIG. 2. This causes the finger 174 to be forced into the control chamber 64 of the shock absorber, air spring assembly 30 against the top of the shock absorber cylinder 54 where it is maintained to sense relative movement between the shock absorber cylinder 54 and the dust shield 56. These points represent relatively moving points on the unsprung and sprung portions of the automobile 10.

The same spring bias causes the ear or lobe segments 184, 186 on the cam element 172 to carry each of the yoke members 190, 192 upwardly against the stop 196.

By virtue of the above-described cam element 172 and yoke assembly 188, movements of the element about the axis of shaft 176 normally causes a direct reciprocating movement of the shaft 120.

Under circumstances, however, where the shield 56 moves toward the shock absorber cylinder 54 an midpoint sufficient to move the cam finger 174 inwardly of the housing interior 94 to the upper dotted line position shown in FIG. 2, the yoke assembly 188 will move against the spring force of coil spring 194 and cause the member 190, 192 to move downwardly of the stop flange or shoulder 196 to decouple the shaft 120 from the cam 172 thereby to prevent damage to the operating shaft 120 and the valving components and damping assembly connected therewith.

The operation of the aforedescribed multifunction controller 50 includes a "neutral" operating phase wherein the inlet valve assembly 84 and the exhaust or outlet valve assembly 100 are both closed and the valve engaging clip member 160 is located at an intermediate point between the head portions of the operating stems of both the inlet and exhaust valves. This position is illustrated in FIG. 3.

At this position, the operating shaft 120 locates the damping piston 146 at approximately the midpoint of the dash pot bore 130 and in engagement with the top shoulder 152.

In this position, the controller 50, in the representatively illustrated automatic level control system 40, serves to block the pressure control chamber 64 of the fluid spring part of the combination assembly 30 from both high- and low-pressure conduits 44, 46.

The neutral position represents that position wherein the chassis frame member 12 is maintained at a desired height relationship with respect to the rear suspension assembly 14. The neutral operating position is obtained by adjusting the pressure level in the control chamber 64 in accordance with changes in the static load on the vehicle chassis that can cause varying degrees of spring deflection in the primary coil spring 34.

Under neutral operating conditions, as the vehicle 10 passes over a roadway, dynamic conditions cause the chassis frame 12 to move toward and away from the axle housing and control arm 22 secured thereto at a high frequency road movement oscillation. This oscillation causes the dust shield to move toward and away from the shock absorber housing 54 thereby causing the cam finger 174 that is spring biased against the top of the shock absorber cylinder 54 to oscillate about the axis of the cam element shaft 176 more or less continuously.

In accordance with certain principles of the present invention, the damping piston 142 will prevent valve opening and closing movement from occurring under such high frequency movement. Thus, when the dust shield 56 moves away from the shock absorber cylinder 54 to cause the finger 174 to move in a direction outwardly of the housing interior 94 into the lower dotted line position in FIG. 2, the operating shaft 120 will move the piston 142 upwardly within the dash pot bore 130 and the fluid flow from one side of the piston to the opposite side thereof will be limited to flow through the annular restricted orifice 146. Since the aforedescribed movement is of a highly dynamic character and the vehicle quickly returns in the opposite direction, the degree of damping will prevent the valve operating clip member 160 from engaging the exhaust valve 92.

Assuming relative movement between the dust shield 56 and shock absorber cylinder 54 in an opposite direction so as to cause the cam finger 174 to move in the direction of the upper dotted line position in FIG. 2, the operating shaft 120 will be moved downwardly by the cam element 172 and the piston 142 will shift a limited distance to the stop shoulders 156 on the prongs 150. This distance is less than the dead band travel distance between the illustrated neutral location of the spring clip 160 and the head 92 of the operating stem for the inlet valve 84.

So long as the relative movement quickly reverses itself, as is the case in normal road movements between the sprung and unsprung masses, the piston 142 positioned on the shoulders 156 of the prongs 150 will again have fluid flow from the opposite sides thereof restricted through a limited lower part of the V-shaped grooves 154 and the restricted annular orifice 146 to produce a sufficient dampening of further downward movement of the operating shaft and a commensurate time delay that will prevent the clip 160 from acting upon the head 92 so as to open the valve 84.

In addition to the neutral phase of operation and its damping of high frequency road movements, the plural function valve 50 further includes a "fill" phase that occurs when the static loading on the vehicle 10 is increased by passengers entering the car or the like so as to deflect the primary coil springs 34.

When this occurs, the dust shield 56 moves downwardly with respect to the shock absorber cylinder 54 and causes the finger 174 of the cam element 172 to move into the housing interior 94 and assume the dotted line position above the illustrated solid line position. Such movement will cause the cam lobes 184, 186 to move the yoke assembly 188 downwardly against the coil spring 194 that will act on the operating shaft 120 to shift it downwardly.

The first result of such downward shifting movement is to cause the damping piston 142 to shift from the shoulder 152 to the shoulders 156 on the prongs 150. This occurs before the clip 160 is carried downwardly to engage the head 92. As long as there is a sustained load change represented by increase of the static loading on the vehicle chassis, the finger 174 will be maintained in the raised position and the spring 194 will eventually cause the operating shaft 120 to move against the damping action of the piston 142 until the clip 160 travels the full dead band distance from its neutral position to the head 92.

Thereafter, the clip 160 moves further in a downward direction to move the valving element 90 from the core 86, thereby to allow high-pressure air to flow from the hermetically sealed tank of the pressure source 42 through the inlet port 76, through the open valve assembly 84, thence through the interior 94 of the housing 66 and the side outlet 96 into the control chamber 64.

As the pressure increases within the control chamber 64, an upward resultant force is produced on the top mount of the assembly 30 that supplements the load carrying primary coil spring 34 and thereby overcomes the deflection thereinto return the bottom frame 12 to its desired predetermined height relationship with respect to the rear suspension assembly 14.

During this correction, the dust shield 56 is moved away from the cylinder 54 of the shock absorber to return the finger 174 of the cam element 172 to its neutral position as illustrated in solid lines in FIGS. 2 and 3.

When enough pressure is directed into the control chamber 64 to produce a leveling action and the dust shield 56 is moved away from the shock absorber cylinder 54, the cam element 172 will act on the members 190, 192 of the overtravel carriage assembly 188 to move them against the stop flange 196 and thereby move the operating shaft 120 in an upward direction. The distance between the stop shoulders 156 on the prongs 150 and the top shoulder 152 on the operating shaft 120 and the location of the damping piston 142 against the shoulders 156 during fill will cause a quick upward movement of the operating shaft as the piston 142 shifts from the position against the prong shoulders to the top shoulder 152. This quick shift occurs without damping and produces a quick closure of the intake valve 84 when the control chamber 64 is sufficiently pressurized to produce a corrective movement of the chassis. Thus, the valving action is stable since there is little or no overpressurization of chamber 64 that might cause a subsequent exhaust action or any other form of cycling of the valve assemblies 84, 100.

The controller 50 further includes a third phase of operation characterized as "exhaust." This occurs when static loading is removed from the chassis of the vehicle and it is in its desired level or predetermined height relationship.

Such removal of static loading will cause the coil spring 34 to move the chassis including the bottom frame 12 upwardly of the rear suspension assembly 14. When this occurs, the dust shield 56 is moved away from the shock absorber cylinder 54, causing the finger 174 of the cam element 172 to move from its solid line position to the lower dotted line position. This causes the yoke members 190, 192 to pull upwardly on the stop flange 196 of the operating shaft 120 and will move the damping piston member 142 from its illustrated neutral position upwardly in the dash pot bore 130.

During this movement, the damping piston 142 is retained on the upper shoulder 152 and operating shaft movement is damped by flow of viscous fluid through the annular orifice 146 to produce a time delay. This time delay, however, is overcome by the fact that the removal of the static load is a sustained change that maintains an upward force on the shaft 120 to move it and the clip 160 thereon an amount sufficient to traverse the dead band distance between the neutral position of clip 160 and the head 110 on the stem 108 of the exhaust valve 100 and a distance sufficient to raise the valving element 106 of the valve 100 from the core 104.

At this point, pressurized fluid in the control chamber 64 will exhaust through the side outlet 96, the housing interior 94, thence through the exhaust valve assembly 100 and the exhaust port 118 into the low pressure or exhaust conduit 46.

In the representatively illustrated automatic level control system, the presence of a high pressure in the conduit 46 will be detected by the regulator switch 48 to energize the compressor, thereby causing a rapid pump down of the chamber 64 and a build up of pressure in the hermetically sealed canister of the pressure source 42 which is blocked from the system by the closed inlet valve assembly 84.

When the pressure control chamber 64 is reduced a predetermined amount, the resultant load carrying force of the assemblies 30 is reduced sufficiently to allow the reduced static load of the vehicle chassis to deflect the coil springs 34 so as to return the chassis to its desired predetermined height relationship.

To prevent overexhaust of the control chamber 64, and in accordance with certain of the principles of the present invention, as the finger 174 moves from its lower dotted line position toward the solid line neutral position in FIG. 2, the cam element 172 through the overtravel yoke assembly 188 will move the operating shaft 120 downwardly.

Initially, the shaft 120 will travel quickly through a limited movement equal to the distance from the top of the damping piston 142 to the shoulders 156 on prongs 150. The operating shaft 120 will pull through the damped piston 142 to produce shifting of it from the shoulder 152 against the stops 156 to cause the exhaust valve assembly 100 to be quickly closed on movement of the cam element 172 to its neutral position. Thereafter, the movement of shaft 120 is damped by restricted flow viscous fluid through the orifice 146 and the bottom part of the V-shaped openings 154 between the prongs 150.

In this case, the piston 142 will end up in its neutral position against the stop shoulders 156 on the prongs 150. When the piston 142 returns to the neutral position from the opposite direction, it will be on the shoulder 152, but, in either case, the amount of undamped travel of the operating shaft 120 that might occur by virtue of the shift of the piston 142 from one stop shoulder to the other is less than the dead band distance between the clip 160 and the operating stems of the respective valves of the system.

Accordingly, the system, while incorporating a quick return or quick shutoff of the valve assemblies 84, 100, retains a damped movement of the operating shaft sufficient to prevent normal high frequency road movement shifting of the cam element from operating the same valves. As a result, the system is responsive when it needs to be and is operated in a manner to retain a comparatively stable pressure condition in the control chamber 64 during level operation.

The height controller 50 and its combination and relationship with a supplemental fluid spring has been described in a closed loop, pressure system wherein the pressure source is an hermetically sealed canister and electric compressor. It should be emphasized that this is merely representative of one suitable kind of leveling system and, for purposes of the present invention, it is unnecessary to detail the functional parts of such a system. However, in order to fully understand the illustrated closed loop system, reference may be had to copending U.S. application Ser. No. 820,970, filed May 1, 1969, that sets forth the details of the pressure source 42 and its mode of operation.

A working version of the embodiment shown in FIGS. 1 through 11 is used in an automatic leveling system that has a storage tank charged at an operating pressure from 115 to 200 p.s.i. Following delay of the damping unit and in response to an addition of load on the chassis of the vehicle that causes the inlet valve assembly of the unit to open, the fluid spring component was pumped up within 15 seconds.

Following removal of the load causing the vehicle to move into the exhaust phase of operation following damping, the exhaust valve opened to cause the system to pump down within a 1 to 1.5 minutes period.

These results were obtained by virtue of the above-described valving unit over a wide range of operating conditions. On both exhaust and intake valving actions, the clip that engaged the valve stem moved three-sixteenth inch on either side of the neutral position and, thereafter, traveled through a one-sixteenth inch distance to produce full valve opening on both exhaust and intake. The quick return movement of the operating stem or shaft was equal to one-sixteenth inch produced by movement of the damping piston between the shoulders on the prongs and the top shoulder on the shaft itself.

In FIGS. 12 and 13, another embodiment of the invention is illustrated, taking the form of the valve assembly 50 of the embodiments in FIGS. 1 through 11.

The embodiment includes a housing 214 and a cover 216 corresponding to like elements in the embodiment of FIGS. 1 through 11. It further includes a damping assembly 218 in the upper end of the housing 214 that controls movement of an operating shaft 220 which is operatively connected through a yoke assembly 220 to a cam operator identical to cam element 172 of the first embodiment.

The operating shaft 220 includes a square shank 224 on the end thereof which defines a shoulder 226 against which a clip member 228 is secured. Two spaced apart depending extensions 230 on the operating shaft 220 are guidingly received within spaced apart openings through a valve plate 232 and the cover 216 for maintaining vertical alignment of the operating shaft 220 with respect to the housing 214.

An important feature of this embodiment of the invention is the valve plate 232 and its relationship with respect to the housing 214 and cover 216.

More particularly, in the illustrated arrangement, it is part of a unitary valve assembly 234 that can be preassembled and, thereafter, secured between the housing 214 and cover 216 to take the place of the separate spaced apart valve assemblies in the first embodiment.

In the illustrated arrangement, the valve assembly 234 includes spaced apart valve openings 236, 238 in plate 232. The valve opening 238 communicates with an inlet port 240 in the cover 216, thence through a pair of right-angle bores 242 to a cover opening 244 in which is located an intake valve elements 246. This element is secured to one end of an operating stem 248 that passes concentrically and upwardly through the valve opening 238 into the interior 249 of the housing 214. This interior space 249 corresponds to the housing interior 94 and, like it, is communicated with the control chamber of a fluid spring assembly through a side port corresponding to that illustrated in the first embodiment.

The valving element 246 and stem 248 constitute the primary operative components of an inlet valve 250 that has a conical spring 252 surrounding the end of the stem 248 within the chamber 249 with its large diameter end against the upper face 254 of the plate 232 and a small diameter end thereon in engagement with a washer 256 held against a top head 258 on the stem 248.

On the opposite end, the valving element 246 is located by a lock element 260.

By virtue of this arrangement, the valving element 246 is maintained in a normally closed relationship with an annular seat 262 formed in the lower face 263 of the plate 232. In addition to affording the advantage of preassembly of a valving element on a single plate, the aforedescribed valve is held in place without threaded cores or other elements requiring close tolerance adjustment.

This arrangement of the parts with respect to the valve plate 232 is readily accomplished and, it will be noted, they can be assembled without closely checking tolerances between the component and the valving plate 232 itself.

The valving assembly 234 further includes an exhaust valve 264 that includes an elongated operating stem 266 that is directed concentrically through the valve opening 236 into a cover opening 268 that serves to communicate the valve opening 236 with right-angle bores 270 in the cover 216. These, in turn, communicate with an exhaust port 272 that is adapted to be connected to a low-pressure source of an automatic leveling system as was the port 118 in the valve 50 of the first embodiment.

A valving element 274 on the stem 266 is located on the upper face 254 of the valve plate 232 and held in spring biased engagement with an annular valve seat 276 by a conical return spring 278 located within the cover opening 268 and having one end thereof engaging the underside of the valve plate and the opposite end thereof in engagement with a head element 280 fixedly secured to the bottom of the stem 266.

The upper end of the stem includes a head portion 282 located above valve operating clip 228 that includes a side slot 284 like that in the clip in the first embodiment through which the stem 266 is directed whereby the clip 228 is freely movable with respect thereto as it travels from the illustrated neutral position in FIGS. 12 and 13 through a dead band, vertical distance to a point where the upper side of the clip 228 will engage the underside of the head 282, thereby to cause the stem 266 to be lifted upwardly against the spring 278 to move the valve 274 to an open position.

The component parts of the exhaust valve 264 are also locatable with respect to the valve plate 232 without requiring time consuming adjustment of parts.

By virtue of the above-described arrangement of an inlet and exhaust valve on a common valve plate 232, this embodiment of the invention offers the advantage of preassembling the valving components for later inclusion with respect to only two parts of a multifunction controller of this type, namely, the housing 214 and the cover 216.

Furthermore, since a need for core inserts and the like is eliminated and the valves themselves are located on a common reference plane, represented by the plate 232, it is easier to adjust the location of the valve operating clip with respect to the operating stems to obtain a desired dead band travel from the illustrated neutral position to a point where the respective valve operating stems are shifted in a direction to cause selective opening or closing of the inlet port 240 and exhaust port 272 of the unit with an associated pressurizable control chamber of a fluid spring in an automatic leveling control system.

The function of the embodiment of the invention in FIGS. 12 and 13 is that which has been described with reference to the embodiment of FIGS. 1 through 11 and, while the illustrated combined valving package 234 of the embodiment serves to improve the combination unit insofar as it is easier to assemble and to adjust for operation, it should be understood that the valving assembly 234 might have equal use in other devices presenting a like functional environment wherein it is desired to selectively open and close valving units to regulate an associated system and to do so by means of a simple operating member.

A still further embodiment of the invention that has been used in association with the combination shock absorber and air spring of the type set forth in the automatic leveling system 40 in the first embodiment is characterized as a tilt core version of the invention and is explicitly set forth in FIGS. 14 through 18.

Figure 14:
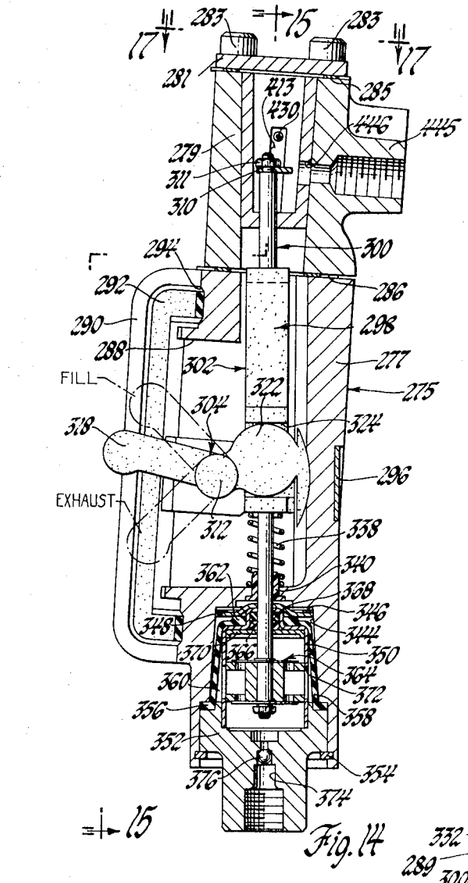
FIG. 14 is a vertical sectional view of another embodiment of the invention.

Thus, in FIG. 14, a valve unit 275 is illustrated that is adapted to be connected on one side of a rigid portion of a fluid spring member, for example, like the dust shield 56 of the fluid spring component used in the first embodiment of the invention.

It includes a housing 277 with an open top that is closed by a cover 279 with a plate 281 thereon which is held by a plurality of capscrews 283 so as to press a gasket 285 into sealing engagement with the cover 279.

The capscrews 283 extend into engagement with the housing 277 and further serve to secure a gasket 286 between it and the cover 279 to seal therebetween.

In this embodiment of the invention, the housing 277 includes a side port 288 that is bounded by a curved face 290 on the side of the housing 277 that is adapted to snugly fit against one side of a curved rigid portion of a fluid spring so as to locate an annular gasket member 292 in sealing engagement therewith. In the illustrated arrangement, the annular gasket 292 is seated within a continuously formed groove 294 in the curved face 290 located in surrounding relationship with the side port 288.

As was the case in the first embodiment, the annular gasket 292 is maintained in a sealed relationship with respect to an associated spring element by means of a connecting band 296 that encompasses both the outer configuration of the housing 277 as well as that of the fluid spring for holding them together.

The tilt core version of the invention further includes a damping assembly 298 located at the base of the housing 277. It controls movement of an operating shaft 300 which is connected through a lost-motion yoke assembly 302 to an oscillatable cam element 304 which is maintained in biased engagement with a movable portion of an associated fluid spring, such as an internally located shock absorber cylinder to reflect sustained changes in the height relationship between a sprung and unsprung mass of a vehicle.

In this embodiment of the invention, the operating shaft 300 is maintained at a predetermined inclination and operates a tilt-type intake valve assembly 306 and tilt-type exhaust valve assembly 308, both supported by the cover 279 in operative relationship with a valve operating plate 310 that is secured to the end of the shaft 300 by a nut 311.

Figure 15:
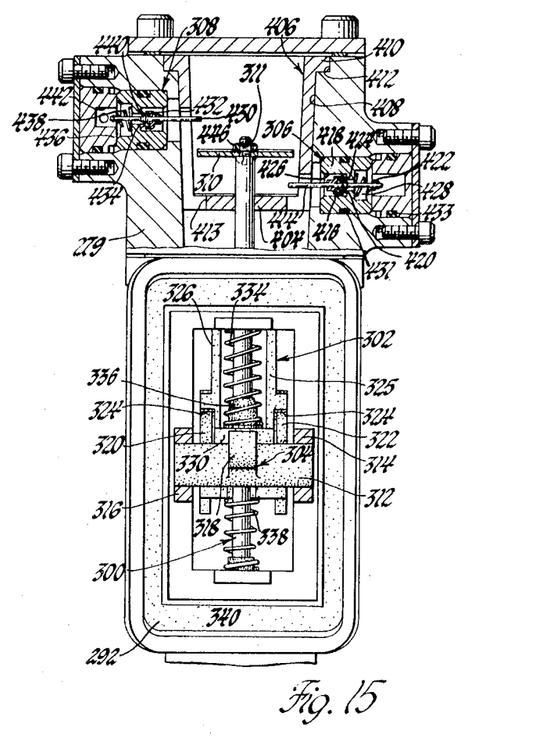
FIG. 15 is a view in vertical section taken substantially along the line 15-15 of FIG. 14 looking in the direction of the arrows.

Referring now more particularly to the cam element 304 and the yoke assembly 302, in this embodiment of the invention, the cam element 304 includes a shaft 312 having the opposite ends thereof journaled in bearings 314, 316 located in opposite walls of the housing 276 as is best illustrated in FIG. 15.

It further includes a finger 318 directed outwardly of the shaft at an inclination therefrom through the side port 288 so as to overlie and be contacted with a movable member, such as the upper end of a shock absorber cylinder.

In the illustrated arrangement, the cam element 304 is shown in solid line in the neutral position thereof, corresponding to a location wherein the sprung and unsprung masses of an associated vehicle are maintained in a predetermined desired height relationship therebetween.

The cam element 304 further includes a pair of spaced apart ear or lobe portions 320, 322 that are directed from the shaft 312 in the direction opposite to that of finger 318. Each of the ears or lobes 320, 322 are received within a side opening 324 of yoke assembly members 325, 326. Each of the yoke assembly parts, seen in FIG. 18, includes a head portion 328 that fits around the outside surface of the operating shaft 300 to slidably support the yoke assembly 326 for overtravel movement with respect to the shaft 300.

Additionally, the yoke members each include a base portion 330 that also fits around the outer diameter of the operating shaft 300. The head 328 on 326 has a depending, semicircular formed extension 332 thereon that coacts with a like extension on the other yoke part 325 to form a spring guide for one end of a coil spring 334 that has the opposite end thereof fit over a sleeve stop 336 that is fixedly secured to the shaft 300 for reciprocating movement therewith.

The details of the relationship between the yoke members 325, 326 and the shaft 300 are more particularly set forth in FIGS. 14 and 15. The spring 324 couples cam element 304 to the yoke. However, when the cam finger 318 is moved in a direction inwardly of the side port 288 to a point upwardly of the uppermost illustrated dotted line position thereof, the lobes 314, 316 on the cam 304 will move the yoke members 325, 326 in the direction of the bottom located dashpot assembly 298 to cause the yoke assembly 302 to move away from the flange of the sleeve stop 336 thereby to decouple the cam element 304 from the remainder of the system when it is forced past the aforedescribed dotted line position through the side port 288, such movement constituting overtravel.

During movement between the dotted line positions marked "Exhaust" and "Fill" in FIG. 14, the cam element 304 has the finger 318 maintained in biased engagement with the top of a shock absorber or like movable component of a fluid spring unit by a spring 338 located around the shaft 300 having one end thereof fit over an extension of a spring guide member 340 seated in the housing 276 and the opposite end thereof fit over joined, semicircular, upstanding members 342 on the base 328 of the yoke members.

The spring 338 produces a moment on the came element 304 causing it to pivot about the axis of the shaft 312 in a direction, as viewed in FIG. 14, counterclockwise about the shaft axis.

The shaft 300 extends downwardly through the spring member guide 340 and into a housing bore 344 which contains the damping assembly 298.

More particularly, it passes through a spring washer 346 seated in the bottom of the bore 344 below a stop element 348 that has a centrally located, depressed segment therein in which is seated an upstanding, small diameter end of a cylinder member 350 which has the lower end thereof fit into a bottom recess of a dashpot cap member 352.

The cap member is held in place in the housing bore 344 by a snapring 354 and it presses a flange 356 on a flexible diaphragm 358 into sealing engagement between the cap 352 and housing 276. The diaphragm 358 is somewhat cylindrical in form and surrounds the cylinder 350 in spaced relationship thereto to form a fluid expansion chamber 360 therebetween which is sealed at its base by press fitting a segment 362 of the diaphragm 358 between the base of the cylinder 350 and the bottom surface of the stop element 348.

The shaft 300 extends into the cylinder 350 where it is connected to a damping piston 364.

A wiper element 366 and O-ring seal 368 are seated in the extension on the cylinder 350 and located in surrounding, sealing and wiping engagement with the outer surface of the shaft 300 where it passes into the interior of the cylinder 350. A retainer element 370 is seated within the cylinder to hold the aforementioned elements in place.

In the illustrated arrangement, the cylinder 350 includes a pair of diametrically opposed, somewhat oval-shaped slots 372 in the sidewall of the cylinder that communicate the interior of the cylinder with the fluid expansion chamber 360. A viscous damping fluid is directed through a port 374 in the dashpot cap 352 to fill the cylinder 350 as well as the space defined by the variable volume fluid expansion chamber 360. During operation wherein the piston 364 is rapidly reciprocated and when the fill port 374 is blocked by a ball plug 376, thermal expansion of the viscous damping fluid will be accommodated by outward expansion of the diaphragm 358 into the unoccupied space within the bore 344.

Figure 16:
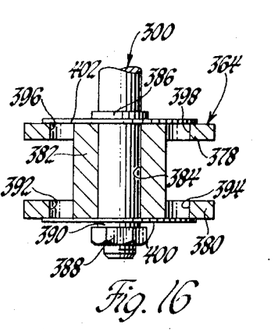
FIG. 16 is a vertical sectional view of a damping piston in the assembly of FIG. 14.
Figure 17:
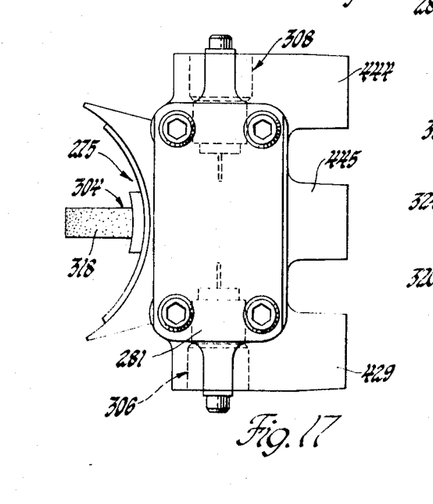
FIG. 17 is a view in top elevation of the assembly of FIG. 14.
Figure 18:
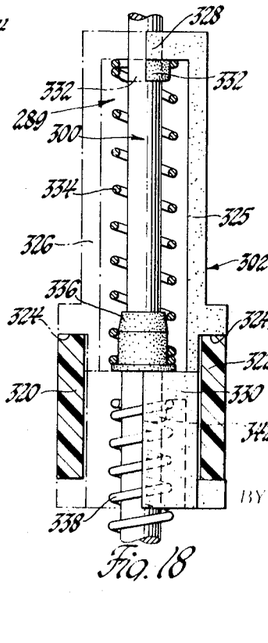
FIG. 18 is an enlarged elevational view of a yoke assembly part in the embodiment of FIG. 14.

Referring now more particularly to the damping piston 364, as is shown in sectional view in FIG. 16, it includes an upper disc 378 joined to a like bottom disc 380 by a central core 382 having an opening 384 therethrough through which the operating shaft 300 extends to locate the upper face of the disc 378 against a stop flange 386 on the operating shaft 300 where it is secured by a nut 388 fastened to a threaded bottom end of the operating shaft 300 to bear against a washer element 390 on the lower face of the disc 380.

The disc 380 includes a pair of diametrically opposed openings 392, 394 therein that are in line with a like pair of holes 396, 398 arranged at diametrically opposed locations in the disc 378.

A flapper valve element 400 is secured by the nut 388 against the lower face of the disc 380 to overlie and block fluid flow through the opposed openings 392, 394 when the piston 364 is moved downwardly by the operating shaft 300 toward the cap 352.

The unit further includes a flapper valve element 402 located on the upper face of the disc 378 to overlie the diametrically located openings 396, 398 therein to block fluid flow therethrough during periods when the piston 364 is pulled upwardly within the cylinder 350 by the operating shaft 300.

In the position illustrated in FIGS. 14 and 15, the piston 364 is located at a point intermediate the ends of the cylinder 350 where the slots 372 are completely covered by the piston so that fluid on either side of the piston must flow through a restricted opening between the outer walls of each of the discs and the sidewalls of the cylinder 350. This restricted flow path produces a substantial damping of movement of the operating shaft 300 for preventing undesirable movements of the damping piston 364 from the neutral position when the cam element 304 is subjected to transient movements of the type that are, for example, produced by road movements of a sprung mass of the vehicle with respect to the sprung mass during normal operation of a vehicle.

During this phase of operation, it is best to maintain a constant pressure in the control chamber of an auxiliary leveling spring and, to do this, the inlet and exhaust valves 306, 308 of the combination are best maintained in a normally closed position to be discussed. The aforementioned damping gives this result.

In accordance with certain principles of the present invention, when the cam element 304 is moved from the solid line neutral position to the dotted line fill position because of an increase in the static loading on the vehicle chassis, a sustained force is directed through the operating shaft to cause it to move downwardly and force the piston 364 into cylinder 350. Following a predetermined time delay that is required to shift the damping piston 364 against the viscous fluid, the valve operating plate 310 is moved through a dead band distance downwardly toward the base 404 of a valve insert 406 seated within a central cavity 408 of the cover casting 278 to protect the sidewalls thereof.

More particularly, the insert 406 includes a top flange 410 seated in a recessed groove 412 of casting 278 and is thereby located to align a first side port 413 therein with a tiltable operating stem 414 that extends from the intake valve assembly 306 interiorly of the insert 406 to underlie the valve operating plate 310.

Accordingly, once the dead band travel has occurred, the plate 310 will engage stem 414 and thereby move a valving element 416 away from an annular seat 418 within a core member 420 of the intake valve 306. The valving element 416 is normally maintained closed by a conical spring 422 located about the stem and having its opposite ends seated respectively against the stem and the core 420. The valving element 416 is held in place by a lock element 424 on the end of the tilt stem 414 which is located within a central bore 426 through the core 420 which communicates with lateral openings 428 in the core 420 which in turn communicates with an intake fitting 429. Spaced apart O-rings 431, 433 in the outer periphery of core 420 seal against the cover 278.

Air flow from the intake fitting 429 through the opened intake valve assembly 306 passes through the side port 413 of the insert 406 and thence into the interior of the body housing 276 and through the side port 288 for inflating an associated fluid spring member. The aforedescribed valve opening action and inflation of the fluid spring corresponds to the "fill" phase of operation discussed with respect to the previously described embodiments.

In this embodiment, when a static load is removed from the vehicle chassis, the cam element 304 is moved under a sustained force into the dotted line exhaust position wherein the operating shaft 300 moves the piston 364 toward the top of the cylinder 350 against the damping resistance afforded by flow of viscous fluid through a limited clearance between the outer periphery of the disc 378 and the wall of the cylinder 350.

Eventually, the valve operating plate 320 will be moved upwardly through a dead band distance within the insert 406 to act on a tiltable operating stem 430 of the exhaust valve 308 thereby to move it downwardly in a direction to tilt a valving element 432 from a valve seat 434 formed in a valve core body 436. The valving element 432 is normally maintained closed against the seat 434 by a conical spring 438 located around the tilt stem 430 and having the opposite ends thereof in engagement respectively with the valving element and the core 436.

The valving element is held in place by a lock member 440 on the stem 430 within a bore 442 through the core. This bore communicates through lateral ports with an exhaust fitting 444 in the opposite side of the body or cover 278 from that in which the inlet fitting 428 is located.

It should be noted that, in this case, the flow from the bore 442 through the lateral opening into the fitting 444 occurs in the downward direction from the longitudinal axis through the valve assembly 308 into intersecting relationship with a bore in alignment with the fitting 444.

In the illustrated arrangement, a third fitting or port 445 is included in the cover 278 and communicates through an opening 446 in the opening of the insert member 406. This port is adapted to be connected to a second fluid spring whereby flow from the multiple function controller unit of this embodiment can supply and exhaust air to a second unit.

This additional capability of the unit is obtained merely by the addition of one side port and an opening 446 in the valve insert 406.

In this embodiment of the invention, quick return is provided from both the fill and exhaust positions of the valve operating plate 310 with respect to the tiltable operating stems 414, 430 in the following manner. When the damping piston 364 has moved into the cylinder 350 after the cam element 304 has assumed its dotted line fill position, the disc 378 on the top thereof will be open on either side by the side slots 372 in the cylinder 350. Thus, when the operating arm 300 moves away from the fill valve stem 414, it will quickly shift back to the illustrated neutral position since fluid is free to flow in bypassed relationship around the piston disc 378 until the top edge of the disc 378 meets the top of the slot 372; at which time, damping again occurs.

Likewise, following a fill operation, the operating shaft 300 will move upwardly within the insert 406 and the damping piston 364 will be located at the base of the cylinder 350 whereby the disc 380 is bypassed by the slots 372 thereby allowing quick return of the operating shaft 300 and the attached damping piston 364 until the top face of the disc 380 is in line with the top of the slot 372; at which time, damping again occurs because of fluid restriction between the disc 380 and the cylindrical wall 350.

A feature of the present invention is that the tilt cores are accurately and easily opened by movement of the valve operating plate 310 even into slight engagement therewith. This embodiment of the invention, as was the case with the embodiments illustrated in FIGS. 1 through 11 and FIGS. 12 and 13, can be easily mounted on an associated fluid spring unit. Moreover, it can be installed quickly and accurately with respect to such a fluid spring movement and control pressure level therein in a reliable manner to assure continuous automatic leveling of a vehicle suspension system.

While the embodiments of the present invention, as herein disclosed, constitute preferred forms, it is to be understood that other forms might be adopted.

What I claim is:

1. A suspension unit for automatically leveling a vehicle chassis with respect to a vehicle axle comprising a first member adapted to be connected to the sprung mass of a vehicle, a second member adapted to be connected to the unsprung mass of a vehicle, means including a rigid wall member connected between said first and second member defining a variable volume pressurizable control chamber for producing an uplifting force against the sprung mass of the vehicle, said rigid wall member including a fluid flow passageway therethrough, a height controller housing fixedly secured to said rigid wall member, seal means on said housing directly fluidly coupling its interior with said control chamber through said fluid flow passageway, an inlet port and an exhaust port in said housing, said housing interior directly fluidly connecting each of said ports with said fluid passageway in said rigid wall, valve means interposed between said inlet and outlet ports and said housing interior for controlling fluid flow therebetween, said valve means having a neutral position for blocking fluid flow through said inlet and said outlet ports, said valve means including a fill position wherein said housing interior is in communication with said inlet port for directing fluid therefrom interiorly of said control chamber to produce a greater uplifting force on the sprung mass, said valve means including an exhaust position wherein said outlet port is communicated with said housing interior for discharging air from said control chamber to produce a lesser uplifting force on the sprung mass, means for operating said valve means including a cam element within said housing and directed interiorly of said control chamber through said fluid passageway, said cam element engageable with one of said first and second members for detecting the relative position therebetween, an operating shaft directed through said housing interior, means for coupling said cam element to said operating shaft for producing movement of said operating shaft in response to movement of said cam element, and coacting means on said operating shaft and said valve means to selectively position said valve means from interiorly of said housing for direct communication with said control chamber through said housing interior.

2. An automatically controlled auxiliary suspension unit for leveling the sprung mass of a vehicle with respect to its unsprung mass comprising, a shock absorber having an outer cylinder, a base mounted on said cylinder adapted to be connected to the unsprung mass of a vehicle, a piston rod directed exteriorly of the opposite end of said cylinder, a cylinder member having an open end and a closed end, said closed end of said cylindrical member connected to said piston rod, means for connecting said piston rod to the unsprung mass of a vehicle, a flexible sealing element interposed between said cylindrical member and said shock absorber cylinder and defining therewith a closed variable volume control chamber adapted to be pressurized to produce a resultant uplifting force on the sprung mass, said cylindrical member having a side port for the passage of pressurized air into and out of said control chamber, a controller housing fixedly connected to said cylindrical member, means on said housing directly communicating its interior with said side port, an inlet and exhaust port in said housing adapted to be connected respectively to a high-pressure source and a low-pressure source, three position valve means between said inlet and said outlet ports including a first position to block communication between both said inlet and said outlet ports and said housing interior, a second position for communicating said inlet port with said housing interior while blocking communication between said outlet port and said housing interior and a third position wherein said inlet port is blocked from said interior and said outlet port is in communication therewith, a reciprocating shaft directed through the interior of said housing, a cam element in said housing interior having a portion directed through said side port in said cylindrical member to a point in intersecting relationship with said shock absorber cylinder, means for supporting said cam element for pivotal movement with respect to said housing, means for spring biasing said cam element portion against the shock absorber cylinder so as to produce pivotal movement of said cam element directly in response to relative movement between said cylindrical member and said shock absorber cylinder in response to changes in a desired trim height relationship between the sprung and unsprung masses of the vehicle, said cam element including a segment thereon located in said housing interior adjacent said operating shaft, means for coupling said interiorly located segment of said cam element to said operating shaft for operating said valve means from interiorly of said housing, said cam element engaging said shock absorber cylinder to maintain said operating shaft in its neutral position when a desired height relationship exists between the sprung and unsprung masses, said cam element being movable in a first predetermined direction upon movement of said shock absorber cylinder and cylindrical element toward one another to cause said operating shaft to shift said valve means into its second control position to directly communicate said housing interior with said intake port whereby said interior directly fluidly couples said intake port with said control chamber to pass high pressure fluid into said control chamber thereby to produce an uplift force on the sprung mass to return the cylindrical member and shock absorber cylinder to a relative position wherein the operating shaft assumes its neutral position, said cam element being movable in a second direction when said cylindrical element and said shock absorber cylinder move apart from one another to cause said operating shaft to move in an opposite direction for positioning said valve means in its third control position for exhausting said housing interior directly to said outlet port to deflate said control chamber to cause a return movement of said cylindrical member with respect to said shock absorber cylinder.

3. In an auxiliary vehicle suspension unit for automatically maintaining the predetermined height relationship between the sprung and unsprung mass of a vehicle the combination of a first member including means adapted to be connected to the unsprung mass of the vehicle, a second member including means adapted to be connected to the sprung mass of a vehicle, means including a rigid wall member forming a pressurizable control chamber between said first and said second members for producing a resultant separating force therebetween adapted to produce a supplemental load carrying capacity in addition to that of a primary suspension spring between the sprung and unsprung masses of the vehicle, said rigid wall member including a port therein, a valve body secured to said wall member overlying said port exteriorly of said control chamber, said valve body including a recessed opening therein in alignment with said wall member port, said valve body including an intake port and an exhaust port therein, first valve means between said intake port and said recessed opening including opened and closed position for controlling fluid flow between said intake port and said recessed opening, second valve means between said outlet port and said recessed opening including open and closed positions for controlling fluid flow between said recessed opening and said outlet port, an operating shaft supported by said valve body for reciprocal movement within said recessed opening, means on said operating shaft for positioning said first and second valve means in their open and closed position, said operating shaft having a neutral position wherein said first and second valve means are both closed to block communication between said recessed opening and said inlet port and said outlet port, a cam element having a shaft portion thereon journaled in said valve body along an axis offset from that of said operating shaft and generally perpendicular thereto, said element including a finger portion located on one side of said shaft extending from said recessed opening interiorly of said control chamber, spring means between said valve body and said cam element biasing said finger interiorly of said chamber into engagement with at least one of said first and second members, said finger element being pivoted about said cam shaft axis in response to relative movement between said rigid wall member and at least one of said first and second members to indicate the relative height position of the sprung and unsprung masses, said cam element including a segment thereon located interiorly of said recessed opening adjacent said valve operating shaft, a yoke member slidably reciprocally received on said operating shaft having a segment thereon in operative engagement with said interiorly located cam segment to be moved thereby with respect to said operating shaft in accordance with the height relationship between said first and second members, a stop element on said operating shaft, spring means in surrounding relationship to said operating shaft biasing said yoke member into engagement with said stop element, said yoke member being movable in a direction away from said stop element when said cam element finger is pivoted beyond a predetermined angular position with respect to said cam shaft axis corresponding to a condition wherein said first and second members are collapsed on one another.

4. A height controller for association with an automatic leveling system for maintaining a predetermined relationship between the sprung and unsprung mass of a vehicle comprising a housing having a damping chamber filled with viscous fluid in one end thereof and a side opening from an operating chamber, means on said housing adapted to locate said side opening in overlying sealed relationship with a fluid flow port in a fluid suspension spring, a reciprocating shaft in said chamber having one end thereof extending into said damping chamber and the opposite end thereof supportingly received by said housing, a cam element including a shaft portion journaled in said housing at said side opening therein, said cam element including a finger portion thereon directed exteriorly of said housing through said side port and pivotably supported with respect to said housing by said shaft portion, said cam element further including a bifurcate segment on the opposite side of said shaft from said finger, a yoke member slidably reciprocally received on said reciprocating shaft, a stop on said shaft, spring means interposed between said yoke member and said stop for spring biasing said yoke member against said stop, said bifurcate cam segment being received by said yoke member and movable on a first pivotal movement of said finger with respect to said cam shaft axis to shift said reciprocating shaft interiorly of said damping chamber, said yoke and said spring means coupling said bifurcate cam segment to said reciprocating shaft to cause opposite movement thereof exteriorly of said damping chamber when said cam finger moves in an opposite direction about said cam shaft axis, said yoke being freely movable with respect to said reciprocating shaft to decouple said cam element from said reciprocating shaft when said cam finger moves to a predetermined point interiorly of said side port, said housing including an intake port and an outlet port, first passageway means communicating said intake port with said operating chamber, second passageway means communicating said outlet port with said operating chamber, first valve means in said first passageway means for controlling fluid flow therethrough, second valve means in said second passageway means for controlling fluid flow therebetween, operating means on said shaft for selectively opening and closing said first and second valve means, said operating means being positioned by said shaft in a neutral position to close both said first and second valve means when said finger of said cam element is in a first predetermined angular relationship, said operating means opening one of said valve means to communicate said operating chamber and one of said ports when said shaft is moved from the neutral position in a first direction, said operating means closing said one of said first and second valve means and opening the other of said first and second valve means when said shaft moves in an opposite direction from said neutral position wherein said operating chamber is in communication with the other of said first and second passageways, and means for damping movement of said operating shaft from its neutral position including a piston located for reciprocating movement within said damping chamber.

5. A height controller for association with an automatic leveling system for maintaining a predetermined height relationship between the sprung and unsprung mass of a vehicle comprising, a height controller housing adapted to be secured to a rigid wall member of a fluid spring, means on said housing for directly fluidly coupling its interior with a control chamber of a fluid spring, an inlet port and an exhaust port in the said housing, valve means interposed between said inlet and outlet ports and said housing interior for controlling fluid flow therebetween, said valve means having a neutral position for blocking fluid flow through said inlet and said outlet ports, said valve means including a fill position wherein said housing interior is in communication with said inlet port for directing fluid therefrom interiorly of the fluid spring control chamber to produce a greater uplifting force on the sprung mass, said valve means including an exhaust position wherein said outlet port is communicated with said housing interior for exhausting air from the fluid spring control chamber to produce a lesser uplifting force on the sprung mass, means for operating said valve means including a cam element adapted to be directed interiorly of the fluid spring control chamber, said cam element being movable in response to changes in the relative height position between the sprung and unsprung mass, an operating shaft directed through said housing interior, means for coupling said cam element to said operating shaft for producing movement of said operating shaft in response to movement of said cam element, and coacting means on said operating shaft and said valve means to selectively position said valve means from interiorly of said housing for direct communication with the fluid spring control chamber through said housing interior, said valve means including a first and a second valve each supportingly received by said housing, a valve operating stem extending exteriorly of each of said valves into said housing interior adjacent said operating shaft, a valving element located on each of said stems and movable thereby from a spring biased seated position to an open position to cause fluid flow communication between said housing interior and one of said ports, each of said stems being selectively engaged by said operating shaft upon movement of said operating shaft from said neutral position thereof to produce selective opening and closing of said valving elements.

6. In a height control valve assembly of the type including an inlet control valve and an outlet control valve selectively operated by movement of a valve operating member responsive to changes in the relative height position between a sprung and an unsprung mass of a vehicle and operative to either direct or exhaust high-pressure fluid into a fluid spring located between the sprung and unsprung mass of a vehicle for controlling the relative height relationship therebetween the improvement comprising, a first housing member having first and second passageways therein, a second housing member including a centrally located opening therein adapted to be communicated with the fluid spring, a single valve plate fastened between said first and second housing portions including a valve port communicating each of said housing passageways with said centrally located opening, means forming a valve seat around each of said ports, said seats being located on opposite faces of said valve plate, a valve stem located through each of said valve ports, a first valving member secured to one of said valve stems within said central opening, spring means on said one of said valve stems for biasing said valving element into sealing engagement with one of said valve seats for sealing fluid flow through one of said valve ports, the other of said stems having a valving element located thereon within one of said housing passageways, spring means on said other of said stems for biasing said second valving element into sealing engagement with the other valve seat on the opposite side of said plate for sealing fluid flow across the other of said valve ports, a valve operating shaft within said centrally located opening including means thereon for maintaining both of said valving elements closed when in a neutral position, said valve operating shaft being movable in a first direction to cause one of said valving elements to open to communicate said central located opening with one of said passageways to direct pressurized flow therethrough for inflating a fluid spring, said valve operating shaft being movable in an opposite direction from its neutral position to open the other of said valving elements to allow pressurized fluid to exhaust from said centrally located opening to the other of said housing passageways for deflating the fluid spring while maintaining said first mentioned valving element closed.

PO-1050
(5/69)

UNITED STATES PATENT OFFICE
CERTIFICATE OF CORRECTION

Patent No. 3,584,894                Dated June 15, 1971

Inventor(s) George W. Jackson

It is certified that error appears in the above-identified patent and that said Letters Patent are hereby corrected as shown below:

```
Column 2, line 22, "This" should be -- The --.
Column 2, line 50, "FIG." should be -- horizontal --.
Column 3, line 19, "13" should be -- 12 --.
Column 4, line 41, "108" should be -- right --.
Column 6, line 66, "shield 56" should be -- dust shield 56 --.
Column 6, line 67, "midpoint" should be -- amount --.
Column 10, line 50, "elements" should be -- element --.
Column 13, line 14, "came" should be -- cam --.

Column 20, line 28, "central" should be -- centrally --.
Column 16, line 37, "cylinder", second occurrence should be
-- cylindrical --.
```

Signed and sealed this 11th day of January 1972.

(SEAL)
Attest:

EDWARD M. FLETCHER, JR.        ROBERT GOTTSCHALK
Attesting Officer              Acting Commissioner of Patents